United States Patent [19]
Grunberg et al.

[11] Patent Number: 4,829,221
[45] Date of Patent: May 9, 1989

[54] METHOD OF CONTROLLING A MOTOR-DRIVEN CLUTCH

[75] Inventors: Pierre Grunberg, Paris; Jean-Claude Mouza, Courbevoie; Patrice Bertin, Mery/Oise, all of France

[73] Assignee: Valeo, Paris, France

[21] Appl. No.: 141,484

[22] Filed: Jan. 7, 1988

[30] Foreign Application Priority Data

Jan. 9, 1987 [FR] France .................... 87 0141

[51] Int. Cl.⁴ .............................. G05B 11/00
[52] U.S. Cl. ...................... 318/587; 192/0.032; 192/90
[58] Field of Search ............ 318/587; 192/0.032, 192/90

[56] References Cited

U.S. PATENT DOCUMENTS

| | | | |
|---|---|---|---|
| 4,650,056 | 3/1987 | Sevennec et al. | 192/90 |
| 4,651,855 | 3/1987 | Grunberg | 192/0.032 |
| 4,750,596 | 6/1988 | Grunberg et al. | 192/7 |

Primary Examiner—William M. Shoop, Jr.
Assistant Examiner—Saul M. Bergmann
Attorney, Agent, or Firm—Charles E. Brown; Charles A. Brown

[57] ABSTRACT

The invention provides a method for controlling a clutch fitted with motorized actuation by means of a pulse-fed direct-current electric motor. According to the invention, the control system of the electric motor comprises a microcomputer associated with a memory, in which values defining the duration of the control pulses of the clutch are stored, and these values can be updated during the operating life to take into account ageing and wear. The invention is particularly suitable for automatic clutch control in an automobile.

11 Claims, 2 Drawing Sheets

METHOD OF CONTROLLING A MOTOR-DRIVEN CLUTCH

BACKGROUND OF THE INVENTION

1. Field of the Invention

The invention relates to a method of controlling a clutch with motorized actuation, and is concerned more particularly with an improvement making it possible to achieve a better control of the actuating stroke of the clutch and, additionally, a control of the state of the clutch over its entire operating life.

2. Description of the Prior Art

A clutch with motorized actuation and suitable for a motor vehicle is known, in which the conventional clutch pedal and the linkage connecting this pedal to the clutch fork are omitted. All these elements are replaced by a mechanism comprising an electric motor and an actuator associated with a spring compensator designed to moderate or regulate the torque which the motor must exert over the entire length of an engaging or disengaging stroke. This spring compensator thus makes it possible to use an electric motor of relatively low power. Such a clutch system is described, for example, in French Patent Application No. 82.04,603 filed by the Applicant. Moreover, electrical control means for the motor have already been described in French Patent Application No. 83.01,748, making it possible to use a conventional direct-current electric motor, the position of which is controlled by a series of electrical pulses. This avoids the need to use a bulky and costly stepping motor, whilst at the same time saving response time. In such a context, therefore, it is important, at any moment, to known and control the position of the actuator (that is to say, the position of the clutch bearing along the driven shaft or what amounts to the same thing, the angle of rotation of the fork coupled to this bearing, or even the position of the reducer mounted at the output shaft of the electric motor) over the entire length of an engaging or disengaging stroke and also for the entire operating life of the clutch, at the same time taking into account the changes in the mechanical characteristics of the system caused by the wear and/or fatigue of certain components. Such knowledge of the position of the bearing at all times makes it possible to control its movement more effectively; it is then possible to ensure that this can be reproduced closely, and to increase the driving comfort of the vehicle. This invention meets all these requirements.

SUMMARY OF THE INVENTION

The invention provides a method of controlling a clutch having motorized actuation by means of a pulse-fed direct-current electric motor, the said motor being coupled to an actuator, wherein, after a certain number of elementary movements have been defined for a forward stroke and for a return stroke of the said actuator and a current pulse of predetermined duration for feeding the said motor has been assigned to each elementary movement, it comprises the steps of storing these predetermined durations in a memory;

reading a sequence of such predetermined durations to prepare the said feed-current pulses;

measuring the position of the said actuator after a said elementary movement or group of elementary movements resulting from the application of the corresponding number of pulses of corresponding stored durations, and correcting one or more stored durations as a function of the deviation between a prescribed position and the measured position.

The said prescribed position is a calculated position which the actuator ought to occupy after the motor has received the said corresponding number of pulses from the start of a forward stroke or of a return stroke respectively. The series of predetermined durations which is stored for a forward stoke is different from the series of predetermined durations stored for a return stroke, and these two series depend on the respective characteristics and non-linearity of the mechanical system. To simplify the electronic system, it is possible to define beforehand the limits of a restricted number of successive steps of movement representing an entire forward or return stroke (from 3 to 8 steps, for example 4 steps) and assign a predetermined number of pulses of one and the same duration to each step, this duration being specific to the step in question. This is equivalent to making a linear approximation of the torque necessary for the movement of the clutch device or generated by the electric motor during each step in question. By clutch device is meant the assembly composed of the actuator, the spring compensator and the clutch. Thus, if these four steps are adopted, only four parameters are stored for a forward stroke of the actuator and four parameters for a return stroke. The pulses are calibrated in such a way that a constant number n of such pulses is applied during the step in question.

The storage of these two series of values, applying to a forward stroke and to a return stroke, also makes it possible, according to another aspect of the invention, to control the change in the mechanical characteristics of the clutch system during its operating lifetime. Thus, during this lifetime, the stored pulse durations for a forward stroke are compared with the stored pulse durations for a return stroke in respect of the various steps mentioned above, respectively, and an absolute or relative deviation greater than a predetermined value between the stored pulse durations compared two by two is signalled as representing a fault or a degree of wear.

DESCRIPTION OF THE PREFERRED EMBODIMENTS

Figure 1:
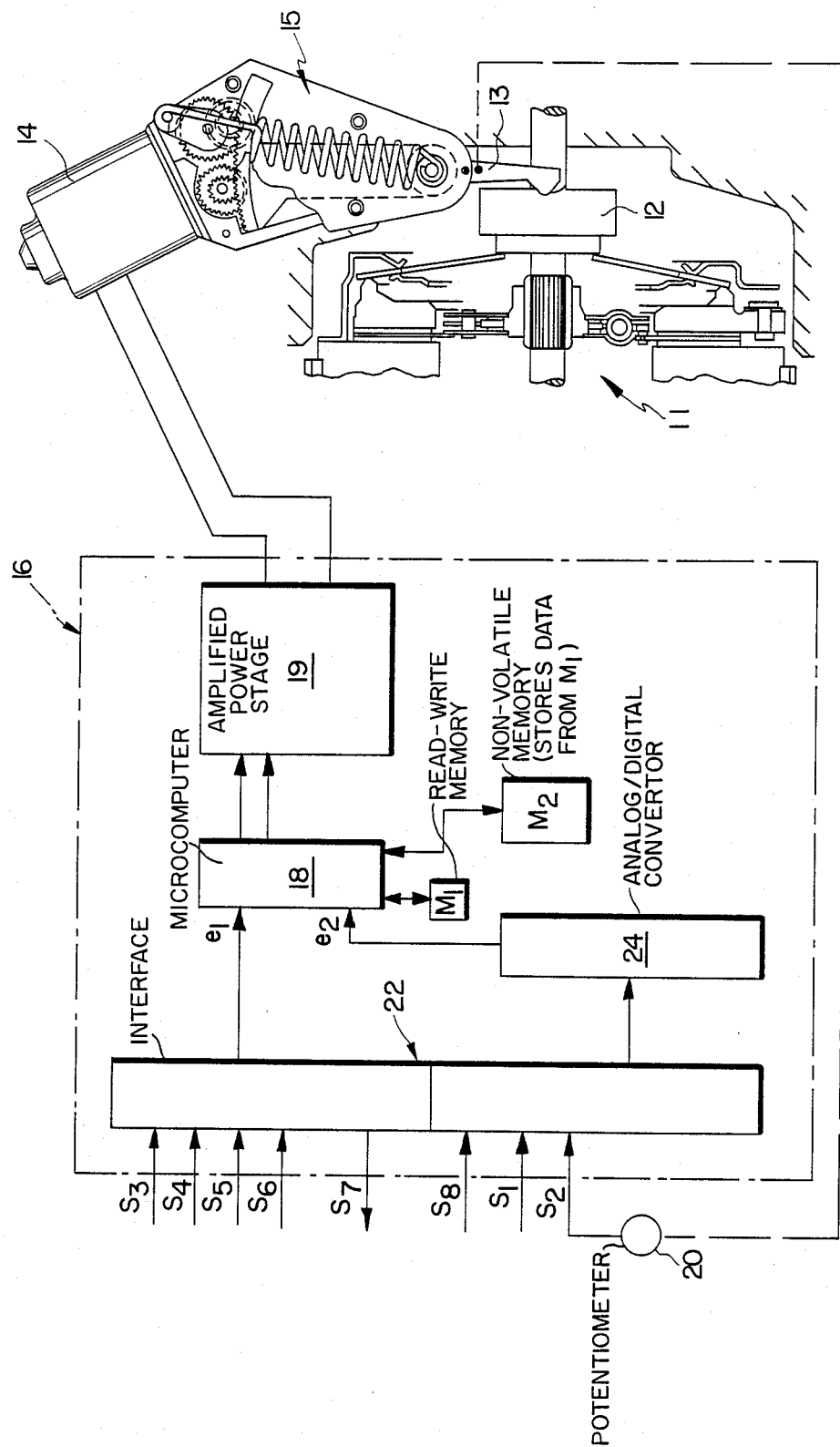
FIG. 1 is a block diagram of the electronic control circuit of a clutch fitted with motorized actuation, according to the invention.

The block diagram of FIG. 1 shows a control system of a conventional clutch 11 of the friction type interposed between a driving shaft (the crankshaft of the vehicle) and a driven shaft (the input shaft of a gear box). The clutch is actuated mechanically by means of a clutch release bearing 12 coupled to an operating lever or fork 13 mounted pivotally. However, the fork, instead of being operated by means of a pedal as in the conventional way, is controlled by an electric motor 14 via an actuator associated with a spring compensator 15. The motor 14 is a direct-current motor controlled by current pulses transmitted by an electronic module 16 arranged around a microcomputer 18. The latter sends a pulse signal to the input of a power stage 19 capable of applying current pulses (in one direction or the other, depending on whether a disengaging stroke or an engaging stroke is carried out) to the windings of the electric motor 14, these pulses having a constant amptitude and a duration prepared by the microcomputer 18. The latter receives, at its inputs $e_1$ and $e_2$, signals representing operating parameters of the vehicle. Of these, mention may be made particularly of two analog signals, one of these $S_1$ representing the position of the accelerator pedal and the other $S_2$ representing the position of the actuator, (bearing, fork or reducer) during an engaging or disengaging stroke. According to the example, this signal is taken from the slide of a potentiometer 20 coupled to the fork 13 or to the mechanical reducer connected to the shaft of the motor 14. The two signals are sent to the microcomputer 18 via a matching interface 22 ensuring that they are shaped and protected. Analog/digital conversion means 24 are also inserted between the said interface and the input $e_2$. Other signals (pulse signals of the all-or-nothing type) are sent to the microcomputer 18 via another section of the matching interface 22. These are respectively:

$S_3$: engine speed;
$S_4$: speed of the input shaft of the gearbox;
$S_5$: speed of the output shaft of the gearbox;
$S_6$: actuator of the gear-change lever by the driver.

An alarm signal $S_7$ can also be prepared by the microcomputer 18 and sent to any signalling means of the vehicle via the interface 22. The microcomputer 18 prepares the control pulses of the motor from parameters represented particularly by the signals $S_1$–$S_6$ and from a succession of pulse durations stored in a read-write memory $M_1$ associated with it. Another so-called non-volatile read-write memory $M_2$ is connected to the microcomputer 18. Its function is to store all the information contained in the memory $M_1$ when the driver breaks contact. It can be, for example, a memory known as "EEPROM" in the art of a read-write memory fed by means of a direct connection to the battery of the vehicle or by a small cell incorporated into the system.

As an example, the assembly formed by the microcomputer 18, the memory $M_1$ and the analog/digital conversion means 24 is obtained from a component, such as the 6805R3 of MOTOROLA, and the memory $M_2$ will be an NMC 9306E of NATIONAL SEMICONDUCTOR.

The operating mode is as follows.

By means of suitable software which is not part of the invention, the microcomputer is capable of generating all the sequences of control pulses corresponding to the various configurations of the engaging and disengaging operations. In particular, rapid operations corresponding to gear changes or to sudden starting prompt the preparation of trains of pulses, the durations of which result essentially from an analysis of the signal $S_2$, that is to say, more specifically, from a comparison between the actual position of the actuator and the position which ought to arise as a result of the number of pulses already applied. If the actuator "lags" in relation to its prescribed position, the microcomputer 19 commands an increase in the duration of the applied pulses. If, on the contrary, the actuator is in "advance" the microcomputer commands a reduction in the duration of these pulses and even purely and simply their elimination at certain points over the stroke.

The sequences of control pulses correspond to a large number of different driving situations. To handle the number of different driving situations, the system stores in memory two groups of predetermined durations which correspond to the engaging and disengaging operations by the actuator during a normal operational speed. During fast and slow operational speeds, the engagement and disengagement stroke of the actuator results in durations which are above or below the predetermined durations for normal operational speed. The increments of the above or below movements are distinguishable compared to the normal operational speed. As mentioned above, in this embodiment, the stroke of the actuator is divided into four stages. Each stage has a predetermined number n of pulses which are of constant duration. The duration is specific to requirements of each stage. The amplitude of the pulses is also kept constant. Thus, if $n=8$, the engaging or disengaging stroke will be covered completely as a result of the application of 32 successive pulses of only four different durations corresponding to the various stages. Thus, the read-write memory $M_1$ has only to store four predetermined durations for a forward stroke and four predetermined durations for a return stroke, that is to say a total of eight values only. According to a possible embodiment, the predetermined duration associated with each elementary movement is constant in each stage. For so-called slow engaging and disengaging operations, these values are simply read by the microcomputer 18 and serve directly for preparing pulse trains transmitted and amplified by the power stage 19.

According to an important aspect of the invention, the predetermined durations contained in the memory $M_1$ are corrected, as appropriate. If the successive positions of the actuator (the signal $S_1$) and the measured durations do not correspond to the expected positions, and predetermined durations then after each pulse or after a given group of such pulses the memory of the system is updated so the original position at each stage is maintained. This updating of the memory $M_1$ makes it possible to take into account the slow change in the torque generated by the motor and therefore in the mechanical characteristics of the clutch device, particularly the wear of the clutch. As a result of the same arrangement, the system can "teach itself" with the aid of a limited number of engaging and disengaging operations if the durations written in the memory are relatively far from the durations required to obtain the desired movement. This can occur particularly when the clutch is used for the first time. As mentioned above, when the user stops the vehicle, the microcomputer commands the transfer of all the values written in the memory $M_1$ to the non-volatile memory $M_2$. These values serve as references for the next starting operation.

If the vehicle is to travel in countries with an intemperate climate, and especially in countries with a very cold climate, the torque generated by the electric motor 14 will be different from that generated in a so-called temperate region.

There is therefore an additional signal $S_8$ representing the temperature outside the vehicle. When the vehicle is started, the computer will correct the data contained in the non-volatile memory as a function of the signal $S_8$, before rewriting them in the memory $M_1$.

Figure 3:
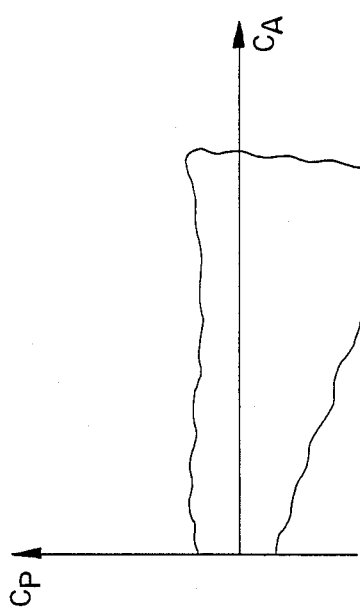
FIG. 3 is a graph illustrating the change in the torque which the direct-current electric motor must generate during a double engaging disengaging stroke when the clutch is new.
Figure 2:
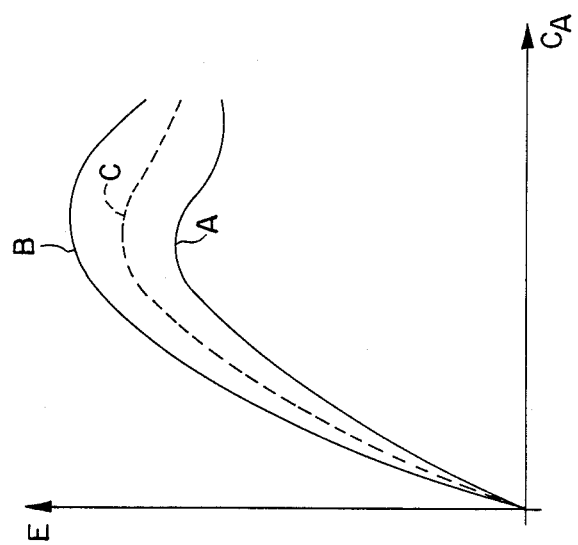
FIG. 2 is a graph illustrating the force/stroke characteristic of the spring compensator in relation to the change in the characteristic of the clutch itself as a function of its own wear.

According to another aspect of the invention, the storage of the predetermined durations can be utilized to signal to the user certain anomalies or excessive wear of the clutch. Thus, FIG. 2 illustrates the force characteristic (E) which it is necessary to exert on the clutch during the actuating stroke ($C_A$) when it is new (curve A) and it is worn (curve B). The curve C shows that the characteristic of the spring compensator associated with the actuator is selected so as to compensate approximately that of a clutch in the middle of its lifetime. Under these conditions, the torque $C_p$ generated by the electric motor 14 over the entire length of a double engaging and disengaging stroke conforms to FIG. 3, when the clutch is new (a higher torque is necessary for re-engagement), and conforms to FIG. 4, when the clutch is completely worn. It will be seen that there is a reversal of the characteristic curve. Thus, in the situation shown in FIG. 3, the pulse corresponding to any given fraction of the disengaging stroke will have a shorter duration than the pulse corresponding to the same stroke fraction during engagement. Conversely, in the situation shown in FIG. 4, the pulse corresponding to any given fraction of the disengaging stroke will have a longer duration than the pulse corresponding to the same stroke fraction during engagement. The microcomputer is programmed to compare periodically two by two (in the memory $M_1$ or even in the memory $M_2$, for example, before starting) the predetermined durations recorded for one and the same portion of the stroke of the actuator during engagement and during disengagement.

Figure 4:
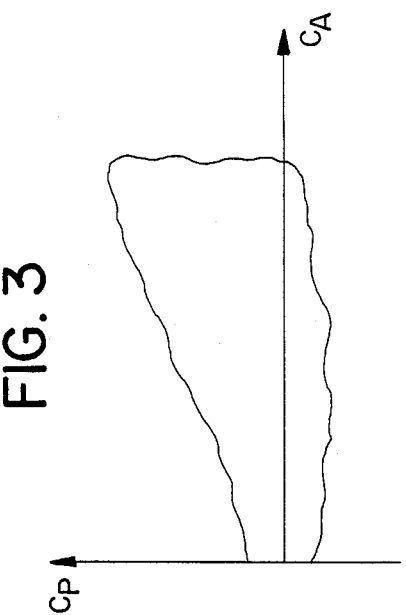
FIG. 4 is a graph illustrating the change in the torque which the direct-current electric motor must generate during a double engaging/disengaging stroke when the clutch is worn.

If the deviation is considerable and corresponds to the situation shown in FIG. 4 (a longer pulse duration during disengagement), a signalling means can be activated. More generally, too great a deviation between the compared predetermined durations will always represent a fault. In particular, besides wear, too great a deviation in the same direction may mean the failure of the spring of the compensator. Too great a deviation in the other direction may mean the failure of the clutch diaphragm.

What is claimed is:

1. A method of controlling a clutch having motorized actuation by means of a pulse-fed direct current motor coupled to an actuator, said method comprising the steps of:

First, establishing a number of elementary movements which define a forward and a return stroke of the actuator; Second, supplying the motor with a current pulse of a predetermined duration which is assigned to each elementary movement; Third, storing the predetermined durations for each elementary movement in a memory; Fourth, reading a sequence of the predetermined durations in preparing the feed-current pulses of the motor; Fifth, measuring the position of the actuator after completion of one of the elementary movements or a group of the elementary movements and after application of the corresponding number of pulses required by the predetermined stored durations; and Sixth, correcting one or more of the predetermined stored durations in response to the deviation between a prescribed position and the measured position of the actuator.

2. A method according to claim 1, including a seventh step of dividing the forward stroke and the return stroke of the actuator into a specific number of stages, and each of these stages is divided into a number of elementary movements.

3. A method according to claim 2, wherein in said seventh step the number of stages selected is between two and eight.

4. A method according to claim 2, wherein in said seventh step the number of stages is equal to four.

5. A method according to claim 2, wherein in said seventh step the forward stroke is divided into as many stages as the return stroke.

6. A method according to claim 2, wherein in said seventh step the number of elementary movements is the same in all the stages.

7. A method according to claim 2, where in said seventh step the predetermined duration associated with each elementary movement is constant in each stage.

8. A method according to claim 1, including a step eight wherein the predetermined stored durations of a forward stroke or a return stroke will be corrected to reflect thhe speed of the actuator when the actuator remains below a selected speed value at which the increments of movement corresponding to the pulses exceed a predetermined value.

9. A method according to claim 8, including a step nine wherein during the operating life of the clutch, the predetermined stored pulse durations for a forward stroke are compared with the stored pulse durations for a return stroke for corresponding increments of movement, respectively, and a deviation greater than a predetermined value between said stored pulse durations compared two by two is signalled as presenting a fault or a degree of wear.

10. A method according to claim 8, including a step ten of filtering the clutch to a vehicle and having a first memory with a content which is rewritten in a nonvolatile second memory when electrical contact with the vehicle is broken, and is rewritten in first memory when electrical contact is resumed.

11. A method according to claim 10, wherein in said tenth step, when electrical contact is resumed, the values contained in the second memory are rewritten in the first memory, and, some of these values are corrected as a function of a signal representing the outside temperature.

* * * * *